(12) United States Patent
Sirito-Olivier

(10) Patent No.: US 6,335,677 B1
(45) Date of Patent: Jan. 1, 2002

(54) COMPARATOR OF A DIGITAL VALUE HAVING CMOS VOLTAGE LEVELS WITH A DIGITAL VALUE HAVING ECL VOLTAGE LEVELS

(75) Inventor: Philippe Sirito-Olivier, Saint Egreve (FR)

(73) Assignee: STMicroelectronics S.A., Gentilly (FR)

( * ) Notice: Subject to any disclaimer, the term of this patent is extended or adjusted under 35 U.S.C. 154(b) by 0 days.

(21) Appl. No.: 09/550,920

(22) Filed: Apr. 17, 2000

(30) Foreign Application Priority Data

Apr. 16, 1999 (FR) .............................. 99 04994

(51) Int. Cl.[7] .............................................. G05B 1/00
(52) U.S. Cl. ................................................ 340/146.2
(58) Field of Search ..................................... 340/146.2

(56) References Cited

U.S. PATENT DOCUMENTS

| | | | |
|---|---|---|---|
| 4,737,663 A | 4/1988 | Varadarajan | 307/455 |
| 5,130,692 A | * 7/1992 | Ando et al. | 340/146.2 |
| 5,381,127 A | * 1/1995 | Khieu | 340/146.2 |
| 5,386,528 A | * 1/1995 | Ando et al. | 340/146.2 |

FOREIGN PATENT DOCUMENTS

EP    0 511 711    11/1992
JP    04 072916    3/1992

OTHER PUBLICATIONS

"Lockbit Detection Using a Decoder and a Comparator," *IBM Technical Disclosure Bulletin*, 32(8A):446–447, Jan. 1990.

* cited by examiner

*Primary Examiner*—Margaret R. Wambach
(74) *Attorney, Agent, or Firm*—Lisa Jorgenson; Robert Iannucci; Seed Ip Law Group, PLLC

(57) ABSTRACT

A comparator of a first digital value of n bits having CMOS voltage levels with a second digital value of n bits having ECL, or CML voltage levels, including a decoder in CMOS technology provided to provide $2^n$ CMOS signals, each of which corresponds to a different product of n bits, each of the n bits being a respective bit of the first digital value or its complement; $2^n$ AND gates in ECL or CML technology respectively associated with the $2^n$ CMOS signals, connected to implement an OR function of $2^n$ ECL or CML signals, each of which corresponds to a different product of n bits taken from among the bits of the second value or their complements, according to the same choice as for the product of n bits of the respective CMOS signal; and means for deactivating the AND gates associated with the CMOS signals to 0.

11 Claims, 2 Drawing Sheets

COMPARATOR OF A DIGITAL VALUE HAVING CMOS VOLTAGE LEVELS WITH A DIGITAL VALUE HAVING ECL VOLTAGE LEVELS

TECHNICAL FIELD

The present invention relates to a circuit for comparing a digital value having CMOS voltage levels with a digital value having ECL ("Emitter-Coupled Logic") voltage levels.

BACKGROUND OF THE INVENTION

CMOS and ECL signals are not compatible. Indeed, CMOS signals practically vary between 0 and the supply voltage to define the two logic states, while ECL signals vary between the supply voltage and a value slightly smaller (about 0.3 volt) than the supply voltage, to define the two logic states.

FIG. 1 shows an example of a circuit where it is necessary to compare ECL signals with CMOS signals. This circuit is a phase-locked loop including a controlled oscillator 10 of high frequency. To operate at high frequencies, circuits in ECL technology are often used.

However, circuits made in ECL technology have a relatively high static current consumption and, thereby, this technology is used only for the portions of a circuit that must operate at high frequency. The other circuits are thus made in CMOS technology. Such a case occurs, for example, in the phase-locked loop of FIG. 1 for a low-pass filter 12 that controls oscillator 10 and a phase comparator 14, the output of which is provided to filter 12.

Phase comparator 14 receives a signal at a reference frequency Fref and the signal provided by oscillator 10 via a frequency divider 16. The dividing ratio of divider 16 is of course sufficiently high to bring the frequency of oscillator 10 down to a value compatible with the CMOS technology, and thus exploitable by phase comparator 14.

A conventional example of a frequency divider 16 is shown in FIG. 1. This divider includes a counter 18 rated by the output signal of oscillator 10. A digital comparator 20 compares the content D of counter 18 with a programmable value N and resets counter 18 when its content D reaches value N. Assuming that the output of divider 16 is reset signal RST of counter 18, a frequency division by N is obtained.

Counter 18 and comparator 20 must be able to operate at the frequency of oscillator 10. They are for this purpose made in ECL technology. However, programming signal N is provided by circuits that do not have to operate at high frequency and it is thus provided by CMOS circuits.

The problem raised thus is to compare a digital value N having CMOS levels with a digital value D having ECL levels.

FIG. 2 shows a solution to compare such signals. In this example, it is assumed that signal N includes two bits N0 and N1, while signal D includes two bits D0 and D1. Each of the bits of signal N is provided to a circuit 22 for converting a CMOS level into an ECL level, the output of which is provided to a first input of an XNOR gate 24 in ECL technology. The corresponding bits of ECL signal D are respectively provided to the second inputs of XNOR gates 24. An AND gate 26 receives the outputs of XNOR gates 24 and provides a logic value 1 when digital values N and D are equal.

In the general case, there are as many converters 22 and XNOR gates 24 as there are bits of values N and D to be compared, AND gate 26 having a corresponding number of inputs.

A disadvantage of this solution is that it requires a high number of elementary ECL gates, each of which adds a static current consumption.

This problem is also encountered in circuits made in CML ("Current-Mode Logic") technology.

SUMMARY OF THE INVENTION

An object of the present invention is to provide a comparator of ECL or CML signals with CMOS signals having a particularly low static current consumption.

To achieve this object, an embodiment of the present invention provides a comparator of a first digital value of n bits having CMOS voltage levels with a second digital value of n bits having ECL or CML voltage levels, including a decoder in CMOS technology provided to provide $2^n$ CMOS signals, each of which corresponds to a different product of n bits, each of the n bits being a respective bit of the first digital value or its complement; $2^n$ AND gates in ECL or CML technology respectively associated with the $2^n$ CMOS signals, connected to implement an OR function of $2^n$ ECL or CML signals, each of which corresponds to a different product of n bits taken from among the bits of the second value or their complements, according to the same choice as for the product of n bits of the respective CMOS signal; and means for deactivating the AND gates associated with the CMOS signals having a value of 0.

According to an embodiment of the present invention, the comparator includes $2^n$ switches respectively controlled by the CMOS signals and each of which is arranged between a differential stage of a respective AND gate and a common biasing current source.

The foregoing objects, features and advantages of the present invention will be discussed in detail in the following non-limiting description of specific embodiments in connection with the accompanying drawings.

DETAILED DESCRIPTION OF THE INVENTION

To make a comparator of ECL signals with CMOS signals having a low static consumption, the logic function of a comparator is decomposed according to the present invention, in a specific way.

Figure 1:
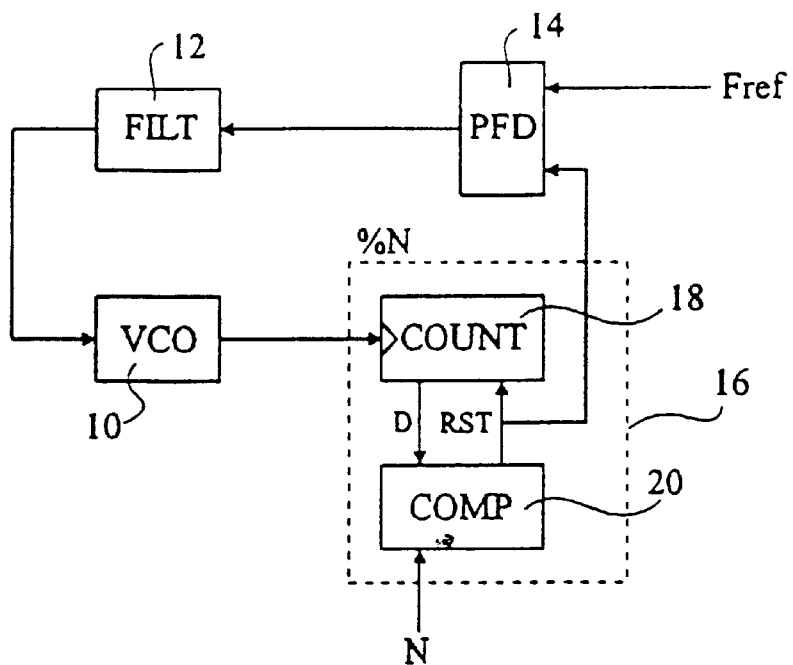
FIG. 1, previously described, shows a conventional phase-locked loop enabling generation of a programmable frequency signal.
Figure 2:
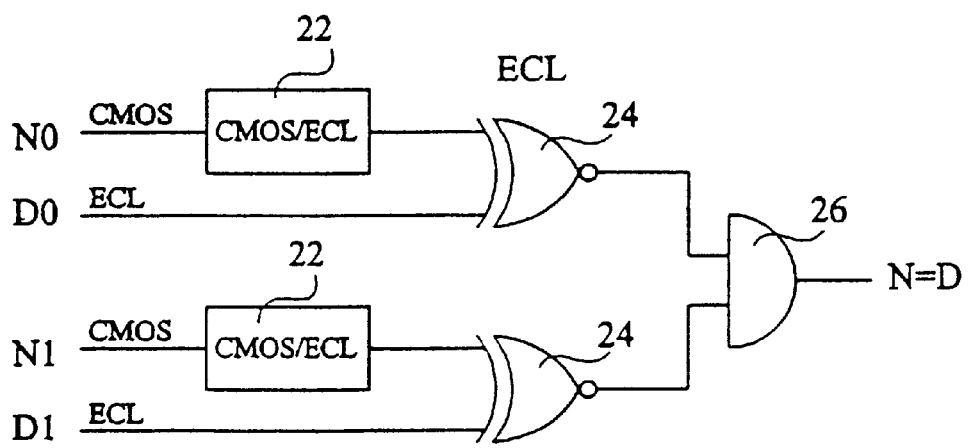
FIG. 2 shows a conventional solution for comparing CMOS signals with ECL signals.

The logic function of the comparator of FIG. 2, thus, in the example where the digital values to be compared are of two bits, is expressed as:

$$(N0 \cdot D0^* + N0^* \cdot D0)^* (N1 D1^* + N1^* D1)^*,$$

where a term X* designates the logic inverse of term X.

Developing this expression and separating the bits coming from CMOS digital value N and the bits coming from ECL digital value D provides:

$$(N0^* \cdot N1^*) \cdot (D0^* \cdot D1^*)$$
$$+ (N0^* \cdot N1) \cdot (D0^* \cdot D1)$$

$+(N0 \cdot N1^*) \cdot (D0 \cdot D1^*)$ $+(N0 \cdot N1) \cdot (D0 \cdot D1)$

Each term $K_1(N0) \cdot K_2(N1)$ is grouped with a term $K_1(D0) \cdot K_2(D1)$, where $K_1(\cdot)$ and $K_2(\cdot)$ are the identity or the inverse function. Terms $K_1(N0) \cdot K_2(N1)$, for the four identity/inverse combinations of functions $K_1$ and $K_2$, have the property that a single one is at 1, whatever the logic values of bits N0 and N1. The same occurs for terms $K_1(D0)$ and $K_2(D1)$.

According to an embodiment of the present invention, all terms $K_1(N0) \cdot K_2(N1)$ are generated by a CMOS circuit, all terms $K_1(D0) \cdot K_2(D1)$ are generated by an ECL circuit, and both circuits are assembled in a specific way to complete the function and reduce the static current consumption to a minimum.

Figure 3:
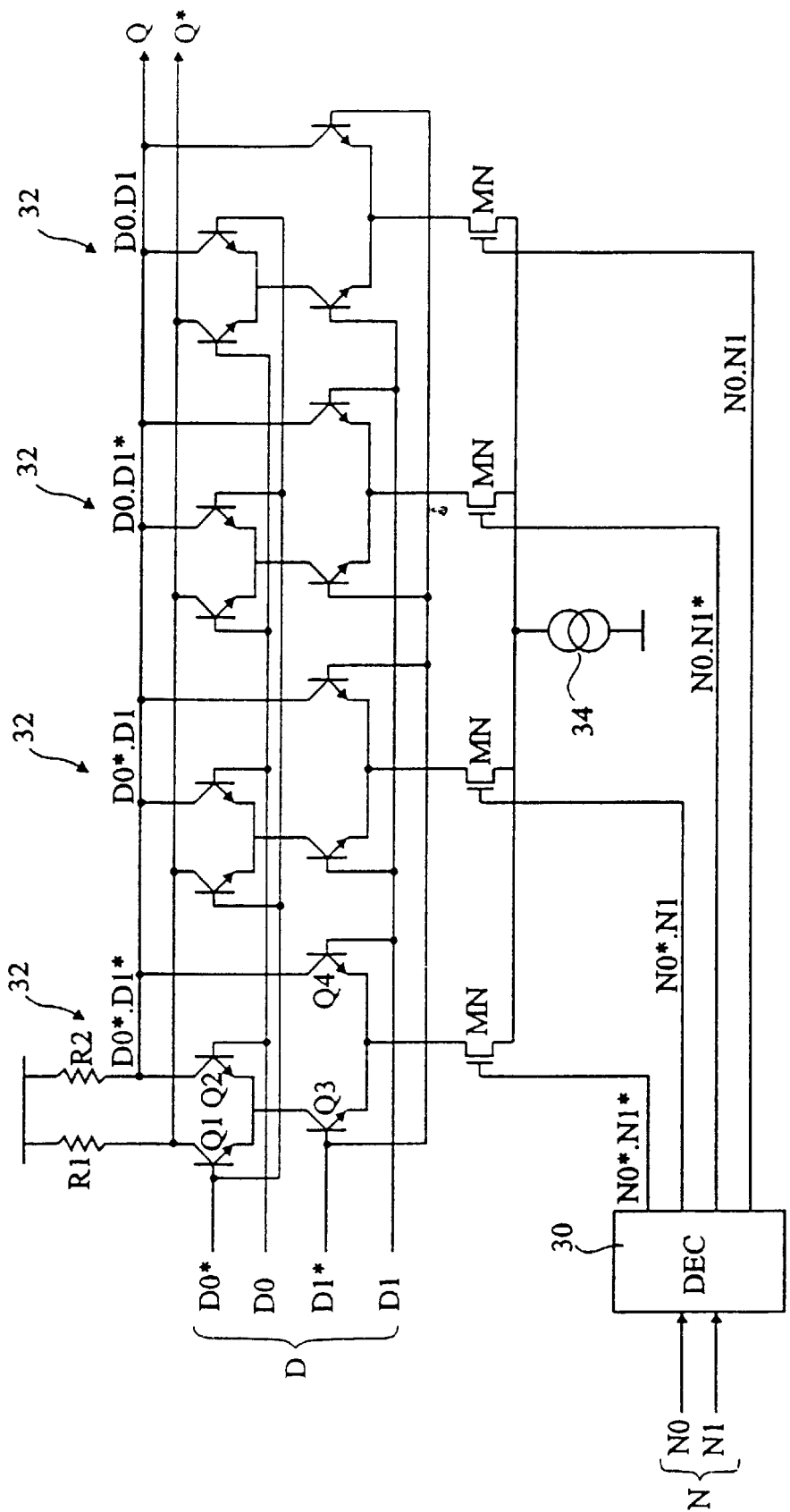
FIG. 3 shows an embodiment of a comparator according to the present invention enabling comparison of CMOS signals with ECL signals.

FIG. 3 shows an embodiment of a comparator formed according to this principle, still in the case where values N and D to be compared are of two bits.

The bits of CMOS digital value N are provided to a decoder 30 in CMOS technology that generates terms N0*·N1*, NO*·N1, N0·N1* and N0·N1 on respective lines. Further, four AND gates 32 in ECL technology are connected to provide on a differential input Q/Q* the result of function D0*·D1 *+D0*·D1+D0·D1*+D0·D1 based on bits D0 and D1 of ECL digital value D.

It should be reminded that a circuit ECL operates in differential mode. Thus, each bit processed by the ECL circuit is represented by a bit and its complementary (D0/D0*, D1/D1*, Q/Q*).

Each ECL AND gate 32 includes a first differential pair of NPN transistors Q1 and Q2, the collectors of which are connected to a high supply potential by two respective resistors R1 and R2. Differential pair Q1/Q2 is arranged in one of the branches of a second differential pair of NPN transistors Q3 and Q4, the other branch of which is connected to a branch of the first differential pair, that is, the collector of transistor Q2 in FIG. 3.

Differential components D0 and D0* are provided to the bases of the transistors of the first differential pairs Q1/Q2, while differential components D1 and D1* are provided to the bases of the transistors of the second pairs Q3/Q4, as shown, to generate terms $K_1(D0) \cdot K_2(D1)$ required on the differential outputs of AND gates 32.

The differential components Q and Q* of the output of each AND gate 32 are sampled on the respective collectors of transistors Q1 and Q2. The outputs of the different AND gates 32 are wired to one another in parallel to perform the required OR functions.

Normally, each ECL gate, and especially its second differential stage Q3/Q4, is biased by a respective current source. Thus, the static current consumption of an ECL logic circuit is proportional to the number of AND gates.

According to the embodiment shown in FIG. 3, a single bias current source 34 is provided for all ECL gates, which source is coupled with ECL gates 32 by respective N-channel MOS transistors MN. Transistors MN are respectively controlled by the outputs of CMOS decoder 30.

As previously indicated, whatever the values of bits N0 and N1, a single one of the outputs of decoder 30 is at 1. Then, the corresponding transistor MN is turned on, which biases the corresponding ECL gate 32 by current source 34. If digital value D appears to be such that the ECL gate 32 thus biased provides logic value 1, logic value 1 appears on output Q/Q* of the circuit, indicating the equality of digital values D and N. In all other cases, the circuit indicates an inequality by a 0.

Thus, although the circuit includes four ECL AND gates, it only consumes the current of a single one. As a result, in the example of two-bit digital values, the static consumption is divided by four.

Of course, the present invention applies to the comparison of n-bit digital values D and N. In this case, decoder 30 generates $2^n$ different terms $K_0(N0) \cdot K1(N1) \ldots K_{n-1}(Nn-1)$, where each of functions K is the identity or the inversion. Functions K vary from one term to the following provided by decoder 30 to represent the $2^n$ possible combinations of inversions and identities of the n bits of value N.

Further, $2^n$ ECL AND gates 32 of n inputs connected to generate the $2^n$ terms $K_0(D0) \cdot K_1(D1) \ldots K_{n-1}(Dn-1)$ respectively corresponding to the terms provided by decoder 30 and to perform the OR operation on these terms are provided.

A three-input ECL gate can be formed by arranging the two differential stages shown in FIG. 3 in one of the branches of a third differential stage, the other branch of which is connected to the collectors of transistors Q2 and Q4. However, the piling of the differential stages is limited by the supply voltage and the AND function may be performed by means of several two- or three-input AND gates, each having to be individually biased. This results in a higher static current consumption than in the case of FIG. 3, but the consumption remains at least $2^n$ times smaller than that which would be normally obtained.

The present invention has been described in relation with circuits in ECL technology, but it also applies to circuits in CML technology.

Of course, the present invention is likely to have various alterations, modifications, and improvements which will readily occur to those skilled in the art. Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A comparator for comparing a first digital value of n bits having CMOS voltage levels with a second digital value of n bits having ECL or CML voltage levels, comprising:

a decoder in CMOS technology structured to provide $2^n$ CMOS signals, each of which corresponds to a different product of n bits, each of the n bits being a respective bit of the first digital value or its complement;

$2^n$ AND gates in ECL or CML technology respectively associated with the $2^n$ CMOS signals, connected to implement an OR function of $2^n$ ECL or CML signals, each of which corresponds to a different product of n bits taken from among the bits of the second digital value or their complements, according to the same choice as for the product of n bits of the respective CMOS signal; and means for deactivating the AND gates associated with the CMOS signals having a value of 0.

2. The comparator of claim 1, wherein the means for deactivating includes $2^n$ switches respectively controlled by the CMOS signals and each of which is arranged between a differential stage of a respective AND gate and a common biasing current source.

3. A comparator for comparing a first digital value of n bits with a second digital value of n bits, comprising:

a decoder having n inputs and $2^n$ outputs, each of the inputs receiving a respective bit of the n bits of the first digital value, the decoder being structured to produce at the $2^n$ outputs $2^n$ different products of n bits, each product being a product of each respective bit of the first digital value or its complement;

$2^n$ AND gates each having a control input, $2^n$ signal inputs, and an output, each signal input of the $2^n$ AND gates receiving a respective bit of the second digital value or its complement, each control input being coupled to a respective one of the $2^n$ outputs of the decoder, and each output being coupled to each other, each AND gate producing at its output a product of the bits received at the signal inputs of the AND gate only if the product received at the control input of the AND gate is an enabling value.

4. The comparator of claim 3 wherein each AND gate includes a control switch having a control terminal coupled to a respective one of the outputs of the decoder.

5. The comparator of claim 4 further comprising a current source connected between a ground and a conduction terminal of each of the control switches.

6. The comparator of claim 4 wherein each AND gate includes a differential stage having first and second input terminals, an output terminal, and a bias terminal; and each control switch includes first and second conduction terminals, the first conduction terminal being coupled to the bias terminal of a corresponding one of the AND gates, the second conduction terminal being coupled to a ground.

7. The comparator of claim 6 wherein the differential stage of each AND gate is a first differential stage, wherein for each AND gate the first and second input terminals of the first differential stage are connected to a first bit of the second digital value and the complement of the first bit, respectively, and each AND gate further includes a second differential stage having first and second input terminals, an output terminal, and a bias terminal, the first and second input terminals are connected to a second bit of the second digital value and the complement of the second bit, respectively, the output terminals of the first and second differential stages are connected to each other, and the bias terminal of the second differential stage is connected to a reference terminal of the first differential stage.

8. The comparator of claim 3 wherein each AND gate includes n differential stages, each differential stage having a first input that receives a respective bit of the second digital value and a second input that receives the complement of the bit received by the first input.

9. The comparator of claim 3 wherein the decoder is structured to receive the first digital value in CMOS voltage levels and the AND gates are structured to operate on ECL or CML voltage level signals.

10. A method of comparing a first digital value having n bits with a second digital value having n bits, the method comprising:
   producing $2^n$ different products each being a product of each respective bit of the first digital value or its complement;
   producing an output product of n inputs, each input being a respective bit of the second digital value or the complement of the respective bit; and
   using whichever one of the $2^n$ different products has a logic one value to select which bits of the second digital value or complements of the bits of the second digital value are used as the n inputs to produce the output product.

11. The method of claim 10 wherein all except one of the $2^n$ different products has a logic zero value, the method further comprising using the $2^{n-1}$ different products of logic zero value to deselect combinations of the bits of the second digital value or complements of the bits of the second digital value that are used as the n inputs to produce the output product.

* * * * *